United States Patent
Rao et al.

[15] 3,674,827
[45] July 4, 1972

[54] PREPARATION OF AROMATIC ISOCYANATES

[72] Inventors: Velliyur Nott Padmanabha Rao, West Haven; John A. Scott, North Haven; Benjamin M. Surowiecki, Jr., Meriden, all of Conn.

[73] Assignee: Olin Mathieson Chemical Corporation

[22] Filed: Sept. 3, 1968

[21] Appl. No.: 757,105

[52] U.S. Cl..................260/453 PC, 252/428, 252/429 A, 252/429 C, 252/461, 252/466 J, 252/470, 252/471
[51] Int. Cl........................................................C07c 119/04
[58] Field of Search ................................260/453 A–453 P, 260/453 PC

[56] References Cited

UNITED STATES PATENTS 3,405,156  10/1968  Stern et al..............................260/453
3,461,149  8/1969  Hardy et al............................260/453

OTHER PUBLICATIONS

George A. Olah, Friedel–Crafts and Related Reactions, Vol. 1, pps. 311– 312, Inters. Publ., New York (1963).

Primary Examiner—Joseph Rebold
Assistant Examiner—Dolph H. Torrence
Attorney—Gordon D. Byrkit, Donald F. Clements, Walter D. Hunter, Thomas P. O'Day, Ellen P. Trevors, Richard S. Strickler, Robert H. Bachman and Donald R. Motsko

[57] ABSTRACT

In the process for preparing an organic isocyanate by reacting an organic nitro compound with carbon monoxide in the presence of a catalyst, improved recovery of the organic isocyanate is obtained when the reaction is carried out in the presence of discrete particles of an oxide of iron. Further improvement in the recovery is also obtained when an oxide of molybdenum, an oxide of chromium, or mixture thereof is also added to the reaction mixture along with the oxide of iron.

25 Claims, No Drawings

PREPARATION OF AROMATIC ISOCYANATES

This invention relates to a novel catalyst system useful in the preparation of organic isocyanates from organic nitro compounds, and an improved method for preparing organic isocyanates.

Organic isocyanates are used extensively in the preparation of urethane foams, coatings, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Pat. No. 672,405 entitled "Process For The Preparation Of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished in the process for preparing organic isocyanates by reacting organic nitro compounds with carbon monoxide at an elevated temperature and elevated pressure in the presence of a catalyst, when the reaction is carried out in the presence of discrete particles of an oxide of iron. Further improvement in the recovery of the organic isocyanate is obtained when an oxide of molybdenum, an oxide of chromium, or mixture thereof is added to the reaction mixture along with the oxide of iron.

Any organic nitro compound capable of being converted to an organic isocyanate may be employed as a reactant. Generally, aromatic, cycloaliphatic, and aliphatic mono- or poly- nitro compounds, which may be substituted, if desired, can be reacted to form the corresponding mono- or poly-isocyanates by the novel process of this invention. The term "organic nitro compound", is used throughout the description and claims to define unsubstituted as well as substituted organic nitro compounds of the type described herein. Typical examples of suitable organic nitro compounds which can be reacted to form isocyanates include the following:

I. Aromatic Nitro Compounds
   a. Nitrobenzene
   b. Nitronaphthalenes
   c. Nitroanthracenes
   d. Nitrobiphenyls
   e. Bis(nitrophenyl)methanes
   f. Bis(nitrophenyl)ethers
   g. Bis(nitrophenyl)thioether
   h. Bis(nitrophenyl)sulfones
   i. Nitrodiphenoxy alkanes
   j. Nitrophenothiazines
II. Nitrocycloalkanes
   a. Nitrocyclobutane
   b. Nitrocyclopentane
   c. Nitrocyclohexane
   d. Dinitrocyclohexanes
   e. Bis(nitrocyclohexyl)methanes
III. Nitroalkanes
   a. Nitromethane
   b. Nitroethane
   c. Nitropropane
   d. Nitrobutanes
   e. Nitrohexanes
   f. Nitrooctanes
   g. Nitrooctadecanes
   h. Dinitroethane
   i. Dinitropropanes
   j. Dinitrobutanes
   k. Dinitrohexanes
   l. Dinitrodecanes
   m. Phenyl nitromethane
   n. Bromophenyl nitromethanes
   o. Nitrophenyl nitromethanes
   p. Methoxy phenyl nitromethanes
   q. Bis-(nitromethyl)cyclohexanes
   r. Bis-(nitromethyl)benzenes All of the aforementioned compounds may be substitued with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrodibenzyl
14. Bis(p-nitrophenyl)methane
15. Bis(2,4-dinitrophenyl)methane
16. Bis(p-nitrophenyl)ether
17. Bis(2,4-dinitrophenyl)ether
18. Bis(p-nitrophenyl)thioether
19. Bis(p-nitrophenyl)sulfone
20. Bis(p-nitrophenoxy)ethane
21. $\alpha, \alpha'$-Dinitro-p-xylene
22. 2,4,6-Trinitrotoluene
23. 1,3,5-Trinitrobenzene
24. 1-Chloro-2-nitrobenzene
25. 1-Chloro-4-nitrobenzene
26. 1-Chloro-3-nitrobenzene
27. 2-Chloro-6-nitrotoluene
28. 4-Chloro-3-nitrotoluene
29. 1-Chloro-2,4-dinitrobenzene
30. 1,4-Dichloro-2-nitrobenzene
31. alpha-Chloro-p-nitrotoluene
32. 1,3,5-Trichloro-2-nitrobenzene
33. 1,3,5-Trichloro-2,4-dinitrobenzene
34. 1,2-Dichloro-4-nitrobenzene
35. alpha-Chloro-m-nitrotoluene
36. 1,2,4-Trichloro-5-nitrobenzene
37. 1-Bromo-4-nitrobenzene
38. 1-Bromo-2-nitrobenzene
39. 1-Bromo-3-nitrobenzene
40. 1-Bromo-2,4-dinitrobenzene 41. α,α-Dibromo-p-nitrotoluene
42. α-Bromo-p-nitrotoluene
43. 1-Fluoro-4-nitrobenzene
44. 1-Fluoro-2,4-dinitrobenzene
45. 1-Fluoro-2-nitrobenzene
46. o-Nitrophenyl isocyanate
47. m-Nitrophenyl isocyanate
48. p-Nitrophenyl isocyanate
49. o-Nitroanisole
50. p-Nitroanisole
51. p-Nitrophenetole
52. o-Nitrophenetole
53. 2,4-Dinitrophenetole
54. 2,4-Dinitroanisole
55. 1-Chloro-2,4-dimethoxy-5-nitrobenzene
56. 1,4-Dimethoxy-2-nitrobenzene
57. m-Nitrobenzaldehyde
58. p-Nitrobenzaldehyde
59. p-Nitrobenzoylchloride
60. m-Nitrobenzoylchloride
61. 3,5-Dinitrobenzoylchloride
62. Ethyl-p-nitrobenzoate
63. Methyl-o-nitrobenzoate
64. m-Nitrobenzenesulfonylchloride
65. p-Nitrobenzenesulfonylchloride
66. o-Nitrobenzenesulfonylchloride
67. 4-Chloro-3-nitrobenzenesulfonylchloride
68. 2,4-Dinitrobenzenesulfonylchloride
69. 3-Nitrophthalic anhydride
70. p-Nitrobenzonitrile
71. m-Nitrobenzonitrile
72. 1,4-Dinitrocyclohexane
73. Bis(p-nitrocyclohexyl)methane
74. 1-Nitro-n-hexane
75. 2,2-Dimethyl-1-nitrobutane
76. 1,6-Dinitro-n-hexane
77. 1,4-Bis(nitromethyl)cyclohexane
78. 3,3'-Dimethoxy-4,4'-dinitro-biphenyl
79. 3,3'-Dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and poly-nitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers. Generally, the organic nitro compounds and substituted organic nitro compounds contain between one and about 20 carbon atoms, and preferably between about 6 and about 14 carbon atoms. The more preferred aromatic nitro compounds are nitrobenzene, dinitrotoluene, nitroisocyanatotoluene and mixtures thereof.

Catalyst systems which may be utilized in the novel technique of this invention include elements and compounds of elements found in Groups Ib, IIb, IIIa, IVa, IVb, Va, VIa, VIb, VIIa, VIII and the Lanthanide series of the Periodic Table shown on page 122 of Inorganic Chemistry, by Moeller, John Wiley and Sons, Inc. 1952. It was found that certain metals and compounds of these metals have a much greater catalytic effect than others, when compared on an equal weight basis. Those metals, in elemental or compound form, which are preferred because they show the greatest catalytic effect are as follows:

1. Palladium
2. Rhodium
3. Vanadium
4. Molybdenum
5. Ruthenium
6. Tungsten
7. Tantalum
8. Chromium
9. Niobium
10. Platinum
11. Cobalt
12. Nickel
13. Germanium
14 Tin
15. Osmium
16. Copper
17. Silver Other Metals which may also be employed as a catalyst, either in elemental or in a compound form, but which are less effective than those listed above are as follows:

1. Aluminum
2. Scandium
3. Manganese
4. Ytterbium
5. Zinc
6. Gallium
7. Yttrium
8. Zirconium
9. Masurium
10. Lutecium
11. Cadmium
12. Indium
13. Lanthanum
14. Hafnium
15. Silicon
16. Rhenium
17. Iridium
18. Titanium
19. Gold
20. Mercury
21. Thallium
22. Lead
23. Cerium
24. Praseodymium
25. Neodymium
26. Illinium
27. Samarium
28. Europium
29. Gadolinium
30. Terbium
31. Dysprosium
32. Holmium
33. Erbium
34. Thulium Compounds of the above elements which can be utilized in accordance with the process of this invention include oxides, sulfates, nitrates, halides, carbonates, sulfides, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, palladium dichloride, palladium difluoride and palladium diiodide; rhodium halides such as rhodium tribromide, rhodium trichloride, rhodium trifluoride, and rhodium triiodide; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_3$), and rhodium dioxide ($RhO_2$); chromic oxide ($Cr_2O_3$), chromic anhydride ($CrO_3$), chromium dioxide ($CrO_2$) and chromous oxide (CrO); molybdenum sesquioxide ($Mo_2O_3$), molybdenum dioxide ($MoO_2$), and molybdenum trioxide ($MoO_3$); ruthenium trichloride ($RuCl_3$), ruthenium pentafluoride ($RuF_5$), ruthenium hydroxide [$Ru(OH_2)B$], ruthenium dioxide ($RuO_2$), and ruthenium tetraoxide ($RuO_4$); niobium oxide ($NbO_2$), and niobium pentoxide ($Nb_2O_5$), tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); and vanadium tetraoxide ($V_2O_4$), and vanadium pentoxide ($V_2O_5$), mixtures thereof, and the like.

In addition, carbonyls of certain elements such as nickel, cobalt, iron, rhodium, molybdenum, chromium, tungsten and ruthenium and carbonyl chlorides of certain elements such as palladium, rhodium, ruthenium and any of the aforesaid elements capable of forming carbonyls can be used as the catalyst. Mixtures of two or more of these carbonyl compounds may be employed as the catalyst system.

Furthermore, the aforesaid catalyst compositions may be used as a mixture or complex with a Lewis base. The Lewis base used as a compound of the catalyst is preferably a heteroaromatic nitrogen compound containing between five and six members in the ring, containing only nitrogen and carbon in the ring, containing no more than two nitrogen atoms in the ring, and containing at least two double bonds in the ring. Suitable compounds of this type are disclosed in The Ring Index by Patterson and Capell, Second Edition, American Chemical Society, 1960, and Supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic ring of the following type:

I. Substituents On The Ring
  a. halides such as chlorine, bromine, iodine and fluorine
  b. alkyl containing between one and 40 carbon atoms
  c. aryl such as phenyl, cresyl and xylyl
  d. olefinic such as allyl, vinyl
  e. hydroxy
  f. mercapto
  g. amino
  h. alkylamino
  i. cyano
  j. oximino
  k. aldehyde
  l. ethers such as aryl, alkyl, and alkenyl ethers
  m. thioethers such as aryl, alkyl, and alkenyl ethers
  n. carboxy
  o. carbalkoxy
  p. carbamyl
  q. carboaryloxy
  r. thiocarbamyl
II. Polycyclic Analogues
  a. fused benzene
  b. fused cycloaliphatic
  c. fused nitrogen-containing heteroaromatic
III. Simple Salts
IV. Quarternary Salts
V. Oxides
VI. Complexes With Inorganic Substances Other Than Noble Metal Halides
VII. Mixtures Of Two Or More Additions Of Types I–VI Listed below are typical heteroaromatic nitrogen compounds and derivatives thereof which are suitable for use as components of the catalyst complex of this invention.

1. Five Membered Ring Containing One Nitrogen
  a. 1-methyl pyrrole
  b. 1-phenyl pyrrole
2. Five Membered Ring Containing Two Nitrogens
  a. imidazole
  b. 1-methyl imidazole
  c. pyrazole
3. Fused Benzene And Fused Nitrogen-Containing Heteroaromatic Derivatives Of Five Membered Rings Containing One Nitrogen.
  a. indole
  b. indolenine (3-pseudoindole)
  c. 2-isobenzazole
  d. indolizine
  e. 4aH-carbazole
  f. carbazole
4. Six Membered Ring Containing One Nitrogen And Derivatives Thereof
  a. pyridine
  b. 2,6-dimethylpyridine
  c. 2,4,6-trimethylpyridine
  d. 4-phenylpyridine
  e. 2-vinylpyridine
  f. 2-styrylpyridine
  g. 2-bromopyridine
  h. 2-chloropyridine
  i. 3-chloropyridine
  j. 2,6-dichloropyridine
  k. 2-bromo-4-methylpyridine
  l. 2-fluoropyridine
  m. 2-allyloxypyridine
  n. 4-phenylthiopyridine
  o. 2-methoxypyridine
  p. picolinic acid
  q. nicotinic acid
  r. 2,6-dicyanopyridine
  s. pyridine-2-aldehyde (picolinaldehyde)
  t. 2-aminopyridine
  u. 4-dimethylaminopyridine
  v. diphenyl-4-pyridylmethane
  w. 4-hydroxypyridine
  x. 2-mercaptopyridine
  y. 2-oximinopyridine (picolinaldoxime)
  z. 4-tertiarybutylpyridine
5. Fused Benzene And Fused Nitrogen-Containing Heteroaromatic Derivatives Of Six Membered Ring Containing One Nitrogen
  a. quinoline
  b. 2-chloroquinoline
  c. 8-hydroxyquinoline
  d. isoquinoline
  e. acridine
  f. phenanthridine
  g. 7,8-benzoquinoline
  h. 4H-quinolizine
  i. naphthyridine
  j. carboline
  k. phenanthroline
  l. Benzo [h] isoquinoline
  m. Benzo [g] quinoline
  n. Benzo [g] isoquinoline
  o. Benzo [h] quinoline
  p. Benzo [f] quinoline
  q. Benzo [f] isoquinoline
  r. 1H-Benzo [de] quinoline
  s. 4H-Benzo [de] quinoline
  t. 4H-Benzo [de] isoquinoline
  u. 1H-Benzo [de] isoquinoline
  v. purine
  w. adenine
  x. pteridine
  y. 7H-Pyrazino [2,3–c] carbazole
  z. Pyrazino [2,3–d] pyridazine
  aa. 4H-Pyrido [2,3–c] carbazole
  bb. Pyrido [1', 2':1,2] imidazo [4,5–b] quinoxaline
  cc. 6H-perimidine
  dd. perimidine
6. Six Membered Ring Containing Two Nitrogens and Derivatives Thereof
  a. pyrazine
  b. 4,6-dimethylpyrimidine
  c. 2,6-dimethylpyrazine
  d. pyridazine 7. Fused Benzene And Fused Nitrogen-Containing Heteroaromatic Derivatives Of Six Membered Rings Containing Two Nitrogens
   a. quinoxaline
   b. 2,3-dimethylquinoxaline
   c. phthalazine
   d. quinazoline
   e. phenazine
   f. cinnoline
8. Simple Salts Of Heteroaromatic Nitrogen Compounds Or Derivatives Thereof In Sections 1–7 Above.
   a. Simple salts include nitrates, hydrohalides, sulfates and acetates of these compounds such as the following:
      1. pyridine hydrochloride
      2. 2-chloropyridine-1-oxide hydrochloride
      3. 4-chloropyridine hydrochloride
      4. 4,4'-bipyridyl dihydrochloride
9. Quaternary Salts of Heteroaromatic Nitrogen Compounds Or Derivatives Thereof Of Sections 2 And 4–7 Above.
   a. Alkyl halides, where alkyl contains 1–40 carbon atoms, acyl halides, and nitroaryl halides, such as:
      1. 1-methylquinolinium chloride
      2. laurylpyridinium chloride
      3. 1-(4-pyridyl) pyridinium chloride hydrochloride
10. Oxides Of Heteroaromatic Bases And Derivatives Thereof Of Sections 2 AND 4–7 Above.
    a. Oxides include oxides of quinoline, pyridine, isoquinoline and imidazole, and are illustrated by the following oxides:
       1. pyridine-1-oxide
       2. 4-bromopyridine-1-oxide
       3. 2-hydroxypyridine-1-oxide
       4. picolinic acid-1-oxide
       5. 4-methoxy pyridine-1-oxide
       6. 2-bromo-6-methylpyridine-1-oxide
       7. 2-picoline-1-oxide
       8. 4-picoline-1-oxide
11. Complexes of Heteroaromatic Nitrogen Compound With Inorganic Substances (Other Than Noble Metal Halides) of Sections 2 and 4-7 Above.
    a. Complexes include pyridine, quinoline and isoquinoline complexes illustrated by the following pyridine complexes:
       1. (pyridine)$_3$ · FeCl$_3$
       2. pyridine · SO$_3$
       3. pyridine · CrO$_3$
       4. pyridine · VCl$_3$
       5. pyridine · V$_2$O$_5$
       6. pyridine · MoO$_3$ The preferred heteroaromatic nitrogen compounds are pyridine, isoquinoline, quinoline and mixtures thereof.

As indicated above, heteroaromatic compounds containing only nitrogen and carbon in the ring are preferably used as the Lewis base, but a heteroaromatic compound which contains only carbon and sulfur or only carbon and oxygen, or carbon and two or more elements selected from the group consisting of nitrogen, sulfur, and oxygen may also be employed as the Lewis base. Typical heteroaromatic compounds, in addition to those mentioned above, include thiophene, dibenzofuran, 2,5-diphenyloxazole, 2-mercapto benzothiazole, thionaphthene, and the like, amy also be used as the Lewis base.

A more complete description of nitrogen-containing heteroaromatic compounds is found in U.S. Pat. application, Ser. No. 691,211, filed Dec. 18, 1967, now U.S. Pat. No. 3,576,835 issued Apr. 27, 1971 by Eric Smith and Wilhelm J. Schnabel. A more complete description of the heteroaromatic compounds containing sulfur, is disclosed in U.S. Pat. application, Ser. No. 709,813, filed Mar. 1, 1968, by Eric Smith now U.S. Pat. No. 3,636,027, issued Jan. 18, 1972. A more complete description of heteroaromatic compounds containing oxygen, and complexes thereof with noble metal compounds is found in U.S. Pat. application, Ser. No. 709,814, filed Mar. 1, 1968, by Eric Smith now U.S. Pat. No. 3,636,028, issued Jan. 18, 1972.

The proportion of catalyst system other than the oxide of iron or other metal oxide described below is generally equivalent to between about 0.001 and about 500 percent, and preferably between about 1 and about 100 percent by weight of the organic nitro compound. However, greater or lesser proportions may be employed if desired.

When a heteroaromatic compound is used as a component of the catalyst system, the molar ratio of the heteroaromatic compound to the anion of the metal compound is generally between about 0.1:1 and about 10:1, and preferably between about 0.5:1 and about 1.5:1, but greater or lesser ratios may be employed if desired.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

All of the foregoing catalyst systems useful in the preparation of organic isocyanates from organic compounds are improved by the technique of this invention by adding to the reaction mixture discrete particles of an oxide of iron. The oxide of iron may be added as ferric oxide, ferrous oxide, or as any compound capable of forming an oxide of iron under the reaction conditions obtained. The discrete particles may range between about $1 \times 10^{-5}$ and about $2 \times 10^{-3}$ inches in diameter, and preferably between about $3 \times 10^{-5}$ and about $8 \times 10^{-4}$ inches in diameter.

The effective proportion of the oxide of iron is generally equivalent to between about 0.1 and about 100 percent and preferably between about 5 and about 20 percent by weight of said organic nitro compound. Greater or lesser proportions may be used if desired.

Although the novel technique of this invention is useful in improving all of the aforesaid catalyst systems, it is preferred to use a noble metal-based catalyst, especially a halide thereof.

Noble metals include ruthenium, rhodium, palladium, osmium, iridium, platinum, silver and gold. It is preferred that the metal be one of the platinum series, including a metal halide selected from the group consisting of halides of palladium, ruthenium rhodium, platinum, iridium and mixtures thereof. Typical examples of suitable halides include palladous dibromide, palladous dichloride, palladous difluoride, palladous diiodide, rhodium tribromide, rhodium trichloride, rhodium trifluroide, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, ruthenium trichloride, ruthenium tetrafluoride, iridium tribromide, iridium tetrabromide, iridium dichloride, iridium trichloride, iridium tetrachloride, iridium triiodide, iridium tetraiodide, and mixtures thereof. Oxides of the noble metals may also be employed and the term "halide of a metal" is used throughout the description and claims is intended to include the above-mentioned metal halides ad well as the corresponding oxides, such as palladium oxide, rhodium oxide, platinum oxide, etc., and the like.

MOre preferably, the catalyst is a mixture or of a complex of a noble metal halide and a Lewis base, and the Lewis base is preferably one of the aforesaid nitrogen-containing heteroaromatic compounds. The use of discrete particles of an oxide of iron in accordance with this invention is particularly effective using the following catalyst systems:
1. Dichloro bis(pyridine)palladium
2. Dichloro bis(isoquinoline)palladium
3. Palladium dichloride
4. Rhodium trichloride
5. Rhodium trichloride + palladium dichloride
6. Rhodium trichloride + palladium dichloride + molybdenum oxide
7. Rhodium trichloride + palladium dichloride + vanadium pentoxide
8. Palladium dichloride + cupric chloride 9. Rhodium trichloride + isoquinoline
10. Palladium dichloride + isoquinoline
11. Rhodium trichloride + pyridine
12. Palladium dichloride + pyridine The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 2.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 psig. After the reaction proceeds and heat is applied, the pressure may increase to as high as 30,000 psig. The preferred reaction pressure is between about 100 and about 20,000 psig. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

$$R(NO_2)_n + 3nCO \quad R(NCO)_n + 2nCO_2 \qquad 1$$

where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. In all cases, however the reaction rate is markedly increased, frequently by a 2 to 10 fold increase, when an oxide of iron is used as a component of the catalyst system in accordance with the process of this invention. Usually between one-half hour and 20 hours are required to obtain the desired degree of reaction, in a batch technique, but shorter or longer reaction times may be employed. In a continuous process, the reaction may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

Further improvement in the conversion and yield of organic isocyanates can be obtained by employing a catalyst system which not only contains a catalyst and discrete particles of iron oxide, but also contains a third component comprised of certain metal oxides. Oxides suitable as a third component of the catalyst system include at least one oxide of an element selected from the group consisting of molybdenum and chromium. Suitable oxides of this type include chromic oxide ($Cr_2O_3$), chromium dioxide ($CrO_2$), chromic anhydride ($CrO_3$), and chromous oxide (CrO); molybdenum sesquioxide ($Mo_2O_3$), molybdenum dioxide ($MoO_2$), and molybdenum trioxide ($MoO_3$). Mixtures of two or more of these oxides may be employed as one component of the catalyst mixture. The proportion of the third component of the catalyst system, when one is employed, is generally equivalent to a weight ratio of the metal compound to the metal oxide in the catalyst system generally in the range between about 0.0001:1 and about 25:1, and preferably in the range between about 0.005:1 and about 5:1. The addition of these metal oxides is of course not necessary if they are already a component of the catalyst system.

The following examples are presented to describe the invention more fully without any intention of being limited thereby. All parts and percentages are by weight unless otherwise specified.

EXAMPLE 1

The reactor in this example was a clean, 100 ml. stainless steel autoclave (316 grade), which was capable of being heated with an external heating mechanism. The autoclave was also provided with a means for introducing gas to the bottom of the autoclave, and it was secured to a motor-driven rocker which operated at 36 cycles per minute.

The change to the autoclave was 3.09 grams of 2,4-dinitrotoluene, 6.59 grams of orthodichlorobenzene, 1.2 grams of dichloro bis(isoquinoline)palladium, 1.5 grams of molybdenum trioxide, and 1.5 grams of ferric oxide.

After charging the autoclave, it was sealed, pressurized with nitrogen and tested for leaks. Nitrogen was released and the autoclave was pressurized with carbon monoxide to a pressure of 2,690 psig. The rocker mechanism was then started, and heating began until a temperature of 190° C. was attained. This temperature was maintained for a period of 90 minutes, during which time the pressure was approximately 3,400 psig.

At the end of the reaction period, the temperature was then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The filtrate was also subjected to analysis by vapor phase chromatography, to determine the weight percentage of 2,4 - dinitrotoluene, 2,4-toluene diisocyanate, 2-isocyanato-4-nitrotoluene and 4-isocyanato-2-nitrotoluene present. The conversion of 2,4-dinitrotoluene was calculated to be 90 percent. The yield of 2,4-toluene diisocyanate and the combined yield of mononitrotolyl isocyanates were calculated and then corrected for the amount of 2,4-dinitrotoluene, if any, which had been recovered. The yield of toluene diisocyanate was 23 percent, and the total yield of isocyanate products was 67 percent.

EXAMPLE 2

The procedure of Example 1 was repeated with the exception that the amount of molybdenum trioxide was 1.0 gram, the amount of ferric oxide was 1.0 gram, and added to the charge was 1.0 gram of chromic anhydride. The operating pressure was 3,750 psig.

The conversion of dinitrotoluene was 97 percent, the yield of toluene diisocyanate was 32 percent, and the yield of total isocyanate products was 76 percent.

EXAMPLE 3

The procedure of Example 1 was repeated with the exception that no molybdenum trioxide was added to the charge, and the total amount of ferric oxide added to the charge was 3.0 grams. The operating pressure was 4,000 psig.

The conversion of dinitrotoluene was 93 percent, the yield of toluene diisocyanate was 22 percent, and the yield of total isocyanate products was 81 percent.

EXAMPLE 4

The procedure of Example 1 was repeated with the exception that the proportion of dinitrotoluene was 3.0 grams, the proportion of orthodichlorobenzene was 16 grams, the proportion of ferric oxide was 0.3 grams, the reaction temperature was 200° C., and the operating pressure was 4,650 psig. The conversion was 100 percent, the yield of toluene diisocyanate was 55 percent and the yield of total isocyanate product was 91 percent.

For purposes of comparison, the above procedure was repeated with the exception that the catalyst system was replaced with 0.36 grams of dichloro bis(isoquinoline)palladium, and no ferric oxide or molybdenum trioxide was utilized. The conversion was 89.4 percent, the yield of toluene diisocyanate was 30.5, and the yield of total isocyanate product was 85.7. This comparison shows the improvement in conversion, yield of toluene diisocyanate and yield of total isocyanate effected in the use of ferric oxide in accordance with the technique of this invention.

EXAMPLE 5

The procedure of Example 1 was repeated with the exception that a stirred autoclave rather than a rocking autoclave was employed. In addition, the initial pressure was 2,630 psig, the operating pressure was 3,820, and the catalyst system was comprised of 12 percent by weight of dichloro-bis(pyridine)-palladium, 3 percent molybdenum trioxide, 6.67 percent pyridine, and 3 percent ferric oxide.

The percent conversion of dinitrotoluene was 99 percent, the yield of toluene diisocyanate was 29 percent, and the total isocyanate products was 38 percent.

EXAMPLE 6

The procedure of Example 5 was repeated with the exception that no molybdenum trioxide was added to the charge, 6.67 percent pyridine was added to the charge, and 12 percent dichloro bis(pyridine)palladium was added to the charge. The operating pressure was 3,800 psig.

The conversion of dinitrotoluene was 99 percent, the yield of toluene diisocyanate was 37 percent, and the yield of total isocyanate product was 37 percent.

EXAMPLE 7

The procedure of Example 5 was repeated with the exception that the proportion of ferric oxide was 6 percent, and instead of adding pyridine and molybdenum trioxide, the noble metal base catalyst was palladium dichloride (1 percent), the maximum pressure was 1,700 psig, and the reaction was carried out at room temperature.

The conversion was 99 percent, and the yield of toluene diisocyanate was 2 percent.

EXAMPLE 8

The general procedure of Example 5 was repeated utilizing the total charge of 150 grams comprised of 15 percent of dinitrotoluene, 6 percent of dichloro bis(isoquinoline)-palladium, 1.5 percent each of $MoO_3$, $Fe_2O_3$ and $CrO_3$, and the remainder (74.5 percent) being ortho dichlorobenzene. The reaction operated at a pressure of 3,000 psig and a temperature of 200° C., while passing carbon monoxide through the reaction mixture at a rate of about 1 liter per minute during the reaction period of about 60 minutes. Analysis of the liquid product showed a conversion of 100 percent of dinitrotoluene, a yield of toluene diisocyanate of 57 percent, and a yield of total isocyanate product of 74 percent.

EXAMPLES 9–14

The general procedure of Example 1 was repeated with the exception that the dichloro bis(isoquinoline)palladium was replaced with the following catalyst systems:

| Example | Catalyst System |
| --- | --- |
| 9 | $PdCl_2$ |
| 10 | $RhCl_3$ |
| 11 | $RhCl_3 + PdCl_2$ |
| 12 | $RhCl_3 + PdCl_2 + MoO_2$ |
| 13 | $RhCl_3 + PdCl_2 + V_2O_5$ |
| 14 | $PdCl_2 + CuCl_2$ |

In each example, the yield of isocyanates was improved by the addition of ferric oxide.

Various modifications of the invention, some of which have been referred to above, may be employed without departing from the spirit of this invention.

What is desired to be secured by letters patent is:

1. In the process for preparing an aromatic isocyanate by reacting an aromatic nitro compound containing up to about 20 carbon atoms with carbon monoxide at an elevated temperature and an elevated pressure in the presence of a catalyst system selected from the group consisting of A. a noble metal compound selected from the group consisting of noble metal halides or noble metal oxides, wherein the noble metal is selected from the group consisting of palladium, rhodium, iridium, platinum, ruthenium and mixtures thereof,
   B. a mixture or complex of
      1. a noble metal compound of A and
      2. a heteroaromatic nitrogen compound having a ring containing
         a. five or six members in the ring,
         b. only nitrogen and carbon in the ring,
         c. no more than two nitrogen atoms in the ring, and
         d. at least two double bonds in the ring, and
   C. a mixture of
      1. a noble metal compound of A, and
      2. an oxide of an element selected from the group consisting of
         a. molybdenum,
         b. vanadium, and
         c. chromium, the improvement which comprises carrying out said reaction in the presence of discrete particles of an oxide of iron selected from the group consisting of ferric oxide and ferrous oxide, wherein the proportion of said oxide of iron is between about 0.1 and about 100 percent by weight of said aromatic nitro compound.

2. The process of claim 1 wherein the proportion of said oxide of iron is between about 5 and about 20 percent by weight of said aromatic nitro compound.

3. The process of claim 1 wherein the proportion of said catalyst system is between about 1 and about 100 weight percent of said aromatic nitro compound.

4. The process of claim 1 wherein said aromatic nitro compound is selected from the group consisting of nitrobenzene, dinitrotoluene, nitroisocyanatotoluene, and mixtures thereof.

5. The process of claim 1 wherein said noble metal compound is selected from the group consisting of palladium chloride, rhodium trichloride, iridium trichloride, rhenium trichloride, platinum tetrachloride and mixtures thereof.

6. The process of claim 5 wherein said oxide of an element is selected from the group consisting of chromic oxide, chromium dioxide, chromic anhydride, chromous oxide, molybdenum sesquioxide, molybdenum dioxide, molybdenum trioxide and vanadium pentoxide.

7. The process of claim 5 wherein said heteroaromatic nitrogen compound is selected from the group consisting of pyridine, isoquinoline, quinoline and mixtures thereof.

8. The process of claim 5 wherein said catalyst system is selected from the group consisting of
   1. Dichloro bis (pyridine)palladium
   2. Dichloro bis(isoquinoline)palladium
   3. Palladium dichloride
   4. Rhodium trichloride
   5. Rhodium trichloride + palladium dichloride
   6. Rhodium trichloride + palladium dichloride + molybdenum oxide
   7. Rhodium trichloride + palladium dichloride + vanadium pentoxide
   8. Palladium dichloride + cupric chloride
   9. Rhodium trichloride + isoquinoline
   10. Palladium dichloride + isoquinoline
   11. Rhodium trichloride + pyridine
   12. Palladium dichloride + pyridine.

9. The process of claim 8 wherein said catalyst system is palladium dichloride.

10. The process of claim 1 wherein the proportion of said catalyst system is between about 0.001 and about 500 weight percent of said aromatic nitro compound.

11. The process of claim 10 wherein said oxide of iron is ferric oxide.

12. The process of claim 11 wherein said ferric oxide has a particle size diameter in the range from about $1 \times 10^{-5}$ to about $2 \times 10^{-3}$ inches.

13. The process of claim 12 wherein said catalyst system is selected from the group consisting of I. a mixture or complex of
   a. a noble metal compound and
   b. a heteroaromatic nitrogen compound
II. wherein said noble metal compound is selected from the group consisting of
   a. palladous chloride,
   b. rhodium trichloride,
   c. iridium trichloride,
   d. rhenium trichloride,
   e. platinum tetrachloride and
   f. mixtures thereof and
III. wherein said heteroaromatic nitrogen compound is selected from the group consisting of
   a. pyridine,
   b. isoquinoline,
   c. quinoline and
   d. mixtures thereof.

14. The process of claim 13 wherein said catalyst system is a mixture of dichloro bis(isoquinoline)-palladium and molybdenum trioxide.

15. The process of claim 13 wherein said catalyst system is a mixture of dichloro bis(isoquinoline)-palladium, molybdenum trioxide and chromic anhydride.

16. The process of claim 13 wherein said catalyst system is dichloro bis(isoquinoline)palladium.

17. The process of claim 13 wherein said catalyst system is a mixture of dichloro bis(pyridine)palladium, molybdenum trioxide and pyridine.

18. The process of claim 13 wherein said catalyst system is a mixture of pyridine and dichloro bis-(pyridine)palladium.

19. The process of claim 13 wherein said reaction is carried out in a solvent of ortho dichlorobenzene.

20. The process of claim 19 wherein the proportion of said catalyst system is between about 1 and about 100 weight percent of said aromatic nitro compound.

21. The process of claim 20 wherein the proportion of said oxide of iron is between about 5 and about 20 percent by weight of said aromatic nitro compound.

22. The process of claim 20 wherein said elevated pressure is in the range between about 30 and about 30,000 psig, said elevated temperature is in the range between about 100° C. and about 250° C., and the proportion of carbon monoxide is in the range between about 3 and about 50 moles of carbon monoxide per nitro group in said aromatic nitro compound.

23. The process of claim 20 wherein said elevated pressure is in the range between about 100 and about 20,000 psig, said elevated temperature is in the range between about 100° C. and 150° C and the proportion of carbon monoxide is in the range between about 8. and 15 moles of carbon monoxide per nitro group in said aromatic nitro compound.

24. The process of claim 20 wherein said catalyst system contains molybdenum trioxide.

25. The process of claim 20 wherein said catalyst system contains chromic anhydride.

* * * * *